June 6, 1933.  G. A. MITCHELL  1,912,535
FILM MOVEMENT
Filed April 25, 1930   3 Sheets-Sheet 1

Inventor
George A. Mitchell.

Attorney.

June 6, 1933.   G. A. MITCHELL   1,912,535
FILM MOVEMENT
Filed April 25, 1930   3 Sheets-Sheet 2

Inventor
George A. Mitchell.

Attorney.

Patented June 6, 1933

1,912,535

UNITED STATES PATENT OFFICE

GEORGE A. MITCHELL, OF LOS ANGELES, CALIFORNIA, ASSIGNOR TO MITCHELL CAMERA CORPORATION, OF WEST HOLLYWOOD, CALIFORNIA, A CORPORATION OF DELAWARE

FILM MOVEMENT

Application filed April 25, 1930. Serial No. 447,296.

This invention relates generally to intermittent movement mechanisms, and more particularly to intermittent film movements for motion picture cameras and the like.

The movement of the present invention is of the general type embodying an oscillative claw arm operable intermittently to engage and pull down the film, and film holding mechanism operable on the film alternately with the claw arm to hold the film in proper register with the exposure aperture while not being moved by the claw arm.

Among the objects of the present invention may be mentioned the provision of a simple film movement of the general type referred to, that is quiet in operation, that has a fast "pull-down" and a long period of "dwell", that has a straight inward and outward motion for the claw arm in engaging and disengaging the film, and one in which the curvature through which the film must be bent is of a relatively long radius.

The present invention will best be understood from the following detailed description of a present preferred embodiment thereof, reference for this purpose being had to the accompanying drawings, in which.

Figure 1:
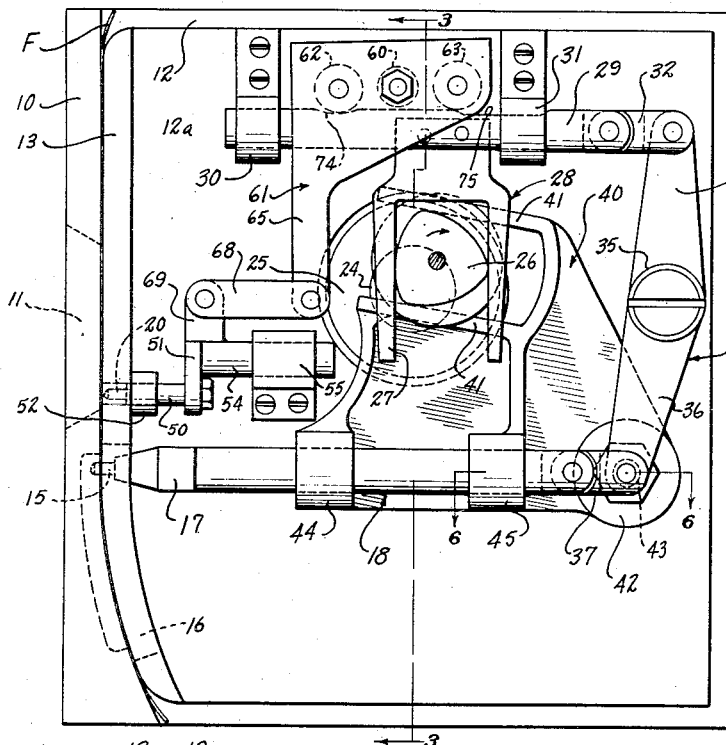
Fig. 1 is a side elevation of the movement showing the position just after the claw arm has engaged the film.

The mechanism of the invention is adapted to be arranged in a case of any suitable design and construction and may be arranged to operate with suitable shutter mechanism and with a suitable arrangement of lenses. For the sake of simplicity, however, the invention is herewith set forth independent of any particular case, shutter mechanism, arrangement of lenses, etc., it being apparent how the mechanism can be incorporated in a suitable design with such units.

Referring now to the drawings, the numeral 10 designates a vertical aperture plate having an exposed aperture 11, and the numeral 12 designates a vertical wall arranged at right angles to and extending rearwardly from an edge of plate 10. Spaced rearwardly from aperture plate 10 and extending at right angles from a plate 12a fastened face to face against wall 12 is a guide plate 13, between which and the aperture plate is provided the guide way for the film F. The film is moved intermittently in the guide way by the film moving mechanism, later to be described, while during the periods of "dwell", or alternately with the periods of movement or "pull-down" the film is engaged by film holding mechanism, which registers the successive film frames $f$ with the exposure aperture 11. The film guide way is vertically disposed except at the lower portion thereof where it is curved rearwardly to conform to the curvature of motion of the film moving means, now to be described.

The film is advanced by means of film moving pins 15 that extend through vertical slots 16 in plate 13 from the ends of a cross arm 17 arranged at the end of a swinging claw-arm 18, which is operated to cause the film moving pins to intermittently engage the film perforations $p$ and draw the film downwardly (or upwardly) through successive frame lengths. The film moving pins are of proper size and are so spaced as to fit nicely in the film perforation.

Pilot pins 20, which are also of proper size and shape to fit nicely in the film perforations, are intermittently operated to engage the film alternately with the film moving pins, in such a manner that the pilot pins engage the film perforations $p$ just before the film moving pins are withdrawn therefrom, and are withdrawn from the film just after the film moving pins again engage the film perforations, so that the film is always engaged by one or the other of the pairs of pins, The drive shaft for the movement is indicated at 24 (see Fig. 3), journalled in a bearing 25 extending through and supported in the walls 12 and 12a of the movement. Just forwardly of bearing 25 shaft 24 has a cam 26 the outer end of which works between the horizontally spaced, downward projections 27 of a horizontally movable follower frame 28, said frame being mounted at its upper edge on a horizontal slide rod 29 supported in slide bearings 30 and 31. The rear end of rod 29 is pivotally connected to one end of a link 32, the other end of which is pivotally connected to the upper end of the upper arm 33 of a lever 34. Lever 34 is in the form of a hub 35 pivotally mounted on the wall 12a, and having the upwardly extending arm 33 and a downwardly extending arm 36. The lower end of arm 36 is pivotally connected to the rear end of a link 37, the forward end of which is pivotally connected to the rear end of the claw arm 18.

It may now be understood how rotation of cam 26 causes horizontal oscillation of the follower frame 28 and slide bar 29, which in turn acts through link 32, lever 34, and link 37 to impart corresponding longitudinal oscillations to the claw arm 18.

Means now to be described are then provided for imparting transverse components of motion to the claw arm, in such a manner that the claw arm is operated to describe a path to intermittently engage and pull down the film. For this purpose, there is provided a follower frame 40 having spaced, parallel edges 41 within which is taken the inner end of the cam 26 (see Fig. 3). This follower frame has at its rear lower edge a hub portion 42 through which passes a pivot pin 43 screw threading into the wall 12a of the movement. Extending laterally from frame 40 are a pair of slide bearings 44 and 45 for support and transverse actuation of the claw arm, 18, which is preferably cylindrical in form, the arrangement here shown being such that the claw arm is supported by bearings 44 and 45 in a plane passing through the pivotal mounting of the follower frame 40.

Figure 2:
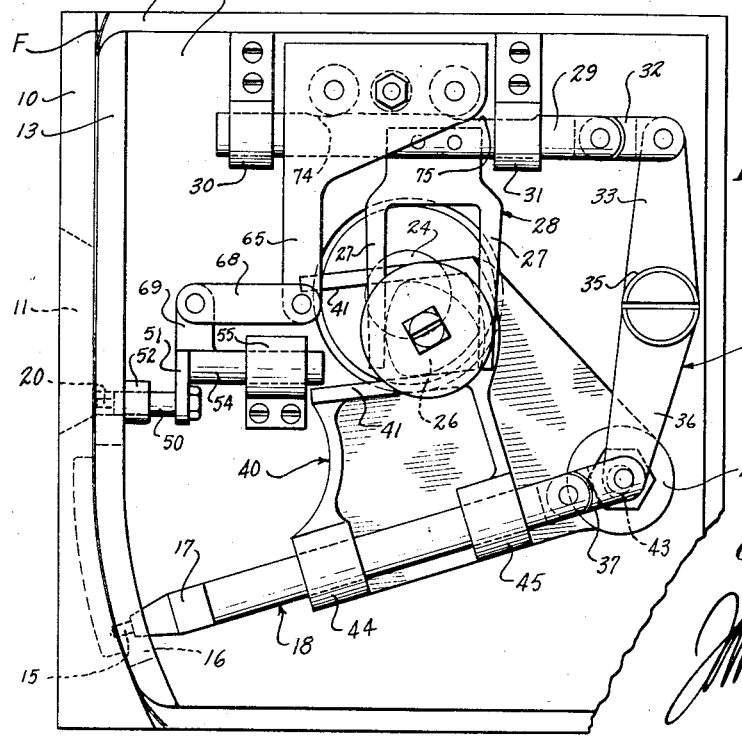
Fig. 2 is a view similar to that of Fig. 1, but showing the position at the end of the pull down stroke.
Figures 3, 4:
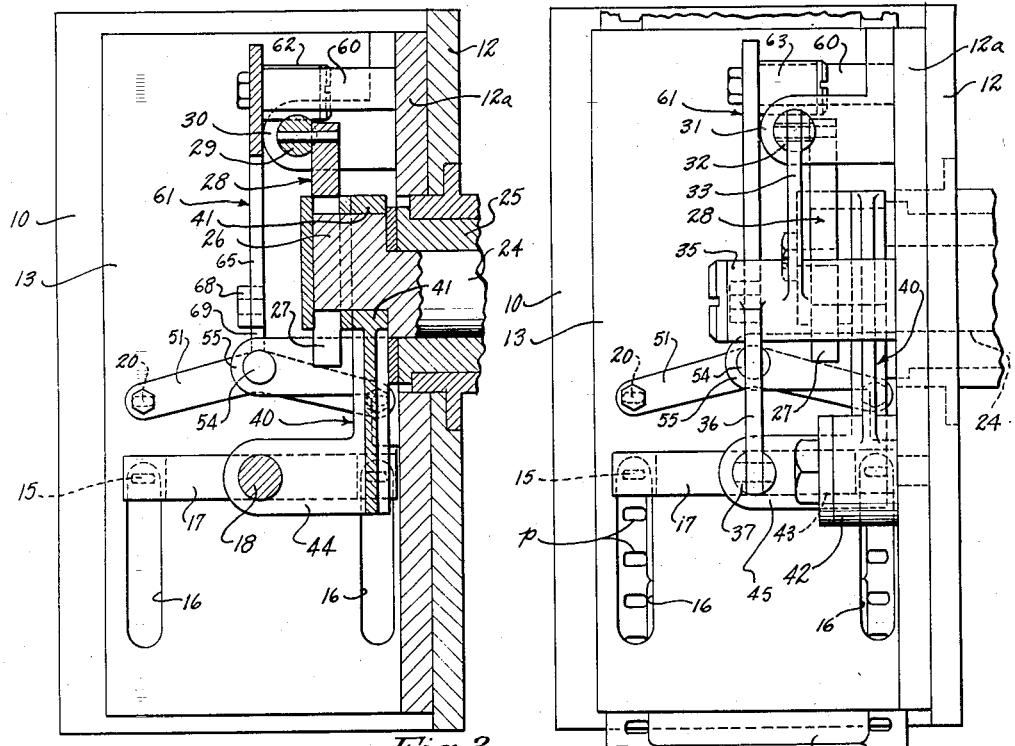
Fig. 3 is a vertical transverse section on line 3—3 of Fig. 1.
Fig. 4 is an end elevation of the movement as seen in Fig. 1.
Figure 5:
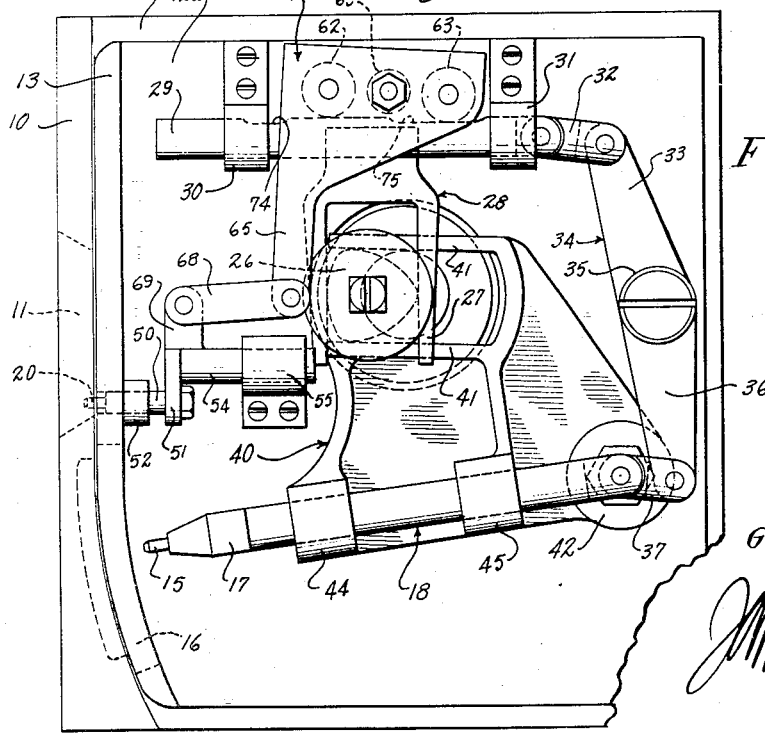
Fig. 5 is an elevation of the movement with the claw arm moving through its return path.

It may now be understood how rotation of shaft 24 and cam 26 in a right handed direction, as viewed in Figs. 1, 2 and 3, causes longitudinal oscillation of claw arm 18 through the medium of the horizontally movable follower 28 and the described interconnections to the rear end of the claw arm, while simultaneously cam 26 causes vertical oscillation of follower frame 40 and hence transverse oscillation of the claw arm 18, the relation being such that at the time the claw arm 18 has been elevated by means of cam 26 and frame 40 to its upper limit of movement, cam 26 is also acting, through follower 28 and the associated interconnecting linkage, to move the claw arm forwardly in the bearings 44 and 45 of frame 40 so as to move the claw arm into engagement with the film (see Fig. 1). Thereafter, the cam 26 moves the frame 40 and arm 18 downwardly through the pull down stroke, while during this period the horizontally movable frame 28 is moved only a short distance further rearward by cam 26, and the claw arm therefore remains in engagement with the film and travels downwardly through a path of relatively long radius of curvature. At the end of the pull-down stroke the parts are in the position of Fig. 2, when cam 26 begins to act quickly to move the frame 28 forwardly and thereby to draw the claw arm rearwardly and out of engagement with the film, cam 26 being at this time in such a position that only a small movement is being given to the follower 40 that controls transverse movement of the claw arm. Then, the claw arm being out of engagement with the film, cam 26 lifts the follower frame 40 to move the claw arm upwardly and through its back or return stroke, as illustrated in Fig. 5.

Figure 7:
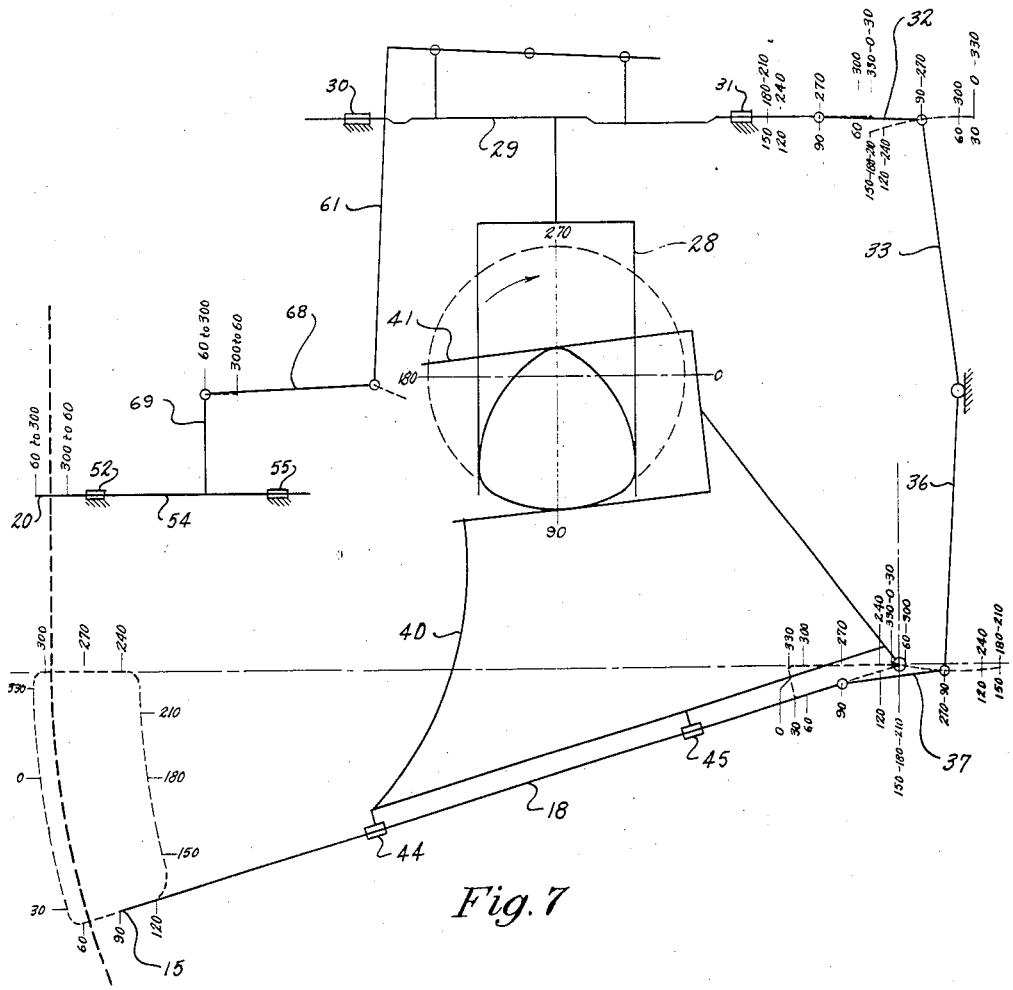
Fig. 7 is a diagram showing the generation of the path of the film moving pins.

In Fig. 7 the path of the film moving pins has been generated by rotating the cam through 360 degrees by 30 degree intervals and marking the successive positions assumed by the ends of the claw arm. It will be noted that the forward end of the claw arm moves in a nearly straight line toward the film in coming into engagement therewith, pulls the film downwardly through only about 100 degrees of rotation of cam 26, and is withdrawn from the film in another nearly straight line. It will also be noted that the curvature of the path of the claw pin is very small during the pull down and that the film therefor travels through a curved path of comparatively long radius.

The proportions of the parts are made such that the pivotal connection of the lower arm of lever 34 with link 37 is coincident with the pivotal mounting 43 of the follower frame 40 when the claw arm is forward and in engagement with the film, so that the claw arm and link 37 pivot on the axis of the pivot mounting of the follower frame 40 during the pull down stroke; and such that the pivotal connection of link 37 with the claw arm is coincident with the pivotal mounting 43 of the follower frame when the claw arm is rearward and fully out of engagement with the film (Fig. 5), so that the claw arm pivots on the axis of the pivot mounting of the follower frame during the return stroke.

It will be noted that two separate motion transmitting means are provided for taking motion off of the single operating cam, one taking off motion in one direction for the in and out movement of the claw arm, and the other taking off motion in another direction for the swinging movement of the claw arm. According to this arrangement the same "throw" is given to both of the motion transmitting means, but it will be seen that since the cam acts on the pivoted follower 40 at a radial distance less than the radial distance to the end of the claw arm, the motion imparted to claw pins on the forward end of the claw arm through the follower 40 is multiplied, in effect, over the motion to and from the film imparted by the cam to the claw arm through the follower 28 and the lever 34, which last may be in the ratio of substantially one to one. The proportioning of the arms of lever 34 might also be relied upon to give the proper relation between the two motions imparted to the claw arm through the two motion transmitting means, though in the present instance this is not done. The diagram of Fig. 7 shows that the motion of the claw pins is preferably designed to be, roughly speaking, about twice as far in the direction with the film as it is to and from the film.

In the embodiment above described a single cam 26 on drive shaft 24 is made to operate both the followers 28 and 40, and it will be understood that this is the preferred arrangement; the described mechanism making it possible to so utilize a single cam and obtain the desired compound claw movement. However, in certain broader aspects, the single cam may be considered as two separate cam elements, one for the follower 28 and the other for the follower 40. In the present embodiment, in which the single cam is utilized for both followers, the cam race-way of the follower 40 is tilted at a proper angle with relation to the claw arm in order to achieve the proper operative relationship between the two driving interconnections between the single cam and the claw arm. If, however, the cam 26 were formed in two separate elements, one for each follower, then the two cam elements might be disposed at an angle relative to each other such that the cam race-way of the follower 40 need not be disposed at the angle illustrated, as will now be clearly understood without further detailed illustration or explanation. In the appended claims I refer to but a single cam with two interconnections between it and the claw arm, but it will be understood that a division of this cam into two cam elements, when combined with the other elements claimed, is deemed to be a full equivalent of the use of a single cam. Thus when two cams are incorporated in a design otherwise peculiar to the present case and covered by claims herein included, such an arrangement is considered to be a full equivalent of the present invention as herein claimed.

The film registering or pilot pin 20, heretofore referred to, extend forwardly from studs 50 carried at the opposite ends of a cross arm 51, studs 50 having sliding bearing within bushings 52 extending through guide plate 15. Cross arm 51 is carried on the forward end of a slide rod 54, the rear end of which is taken in a slide bearing 55. Rod 54 is then operated to engage the pilot pin 20 with the film alternately with the film moving pins 15 by means of an interconnection operated by the slide rod 29, which, it will be remembered, moves longitudinally under the actuation of cam 26 and follower 28, to cause the claw pin to move longitudinally into engagement with and to be withdrawn from the film. This interconnection, which in itself is described and claimed in a copending application entitled "Kinetograph movement", Ser. No. 384,013, filed August 7, 1929, is embodied as follows: Pivoted upon a post 60 extending outwardly from wall 12a is an oscillative member 61 having a pair of rollers 62 and 63 which ride in engagement with the upper surface of slide rod 29 and are engaged and actuated by inclined cam surfaces 74 and 75 formed thereon. It will be apparent how motion of slide rod 29 in one direction, say rearward, as indicated in Fig. 1, causes cam surface 75 to elevate the roller 63, while cam surface 64 allows roller 62 simultaneously to lower, thus swinging the lower end of the oscillative member 61 to the right; and it will be understood how motion of rod 29 in a reverse direction correspondingly causes member 61 to swing toward the left. To the lower end of the depending shank 65 of member 61 is pivotally connected the rear end of a link 68, and the forward end of link 68 is pivotally connected to a lug 69 extending upwardly from slide rod 64.

Figure 6:
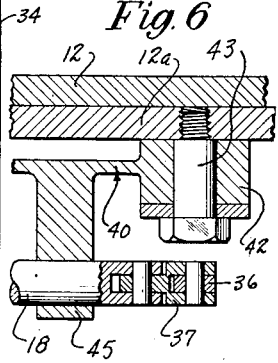
Fig. 6 is a section taken on line 6—6 of Fig. 1.

In Fig. 1 the claw arm 18 has been operated to engage the film, and it will be noted that in this position the slide rod 29 has just moved rearwardly sufficiently far to cause member 61 to act through link 68 and rod 54 to withdraw the pilot pins 20 from the film. As the claw arm is then moved downwardly toward the position of Fig. 2, slide rod 29 moves further toward the right, but the oscillative member 61 remains stationary with its rollers riding on parallel horizontal surfaces of rod 29, and the pilot pins therefore remain stationary and out of engagement with the film. In Fig. 2 the claw arm is being withdrawn from the film, and in this position the slide rod 29 is moving toward the left and its cam surfaces are acting to swing the depending shank of the oscillative member 61 toward the left, thereby acting to reengage the pilot pins with the film. In Fig. 5 the claw arm is shown at the midpoint in its return path, and in this position the slide rod 29 is moved to its extreme left hand position. At this time the oscillative member 61 is remaining stationary, its rollers 62 and 63 riding in engagement with parallel horizontal surfaces of rod 29, and the pilot pins 20 therefore remain in stationary engagement with the film. After passing the position of Fig. 6, the slide rod 29 again moves toward the right, which finally causes the oscillative member 61 to be actuated as previously described in connection with Fig. 1.

It will be seen that according to the above described arrangement the pilot pins are operated to move to and from the film directly by the claw arm moving mechanism that moves the claw arm to and from the film.

In some cases it may be desirable to replace the specific cam utilized for the operation of the claw arm in the preferred embodiment, with a crank or eccentric in order to obtain the increased quietness inherent in crank or eccentric operated mechanisms. A rotational cam of the type illustrated is, in fact, simply a special form of crank or eccentric utilized where motion more irregular than harmonic motion is desired; and the term cam, therefore, when used in the broader claims appended hereto, is to be taken as implying the substitution of a crank or eccentric to be its full equivalent.

I claim:

1. In a film movement, the combination of a frame providing a vertical film guideway, a claw arm adapted to be operated to engage and move a film in the guideway, a rotatable drive shaft, a cam on said drive shaft, a horizontally movable follower for said cam, an operative connection between said follower and said claw arm whereby longitudinal components of motion are imparted to said claw arm, a vertically movable follower for said cam, and a connection between said last mentioned follower and said claw arm longitudinally slidable with relation to said claw arm whereby transverse components of motion are imparted to said claw arm.

2. In a film movement, the combination of a frame providing a vertical film guideway, a claw arm adapted to be operated to engage and move a film in the guideway, a rotatable drive shaft, a cam on said drive shaft, a horizontally movable follower for said cam, a connection between said follower and said claw arm whereby longitudinal components of motion are imparted to said claw arm, a vertically movable follower frame for the cam, and a slide-connection between said follower frame and said claw arm whereby transverse components of motion are imparted to said claw arm.

3. In a film movement, the combination of a frame providing a vertical film guideway, a claw arm adapted to be operated to engage and move a film in the guideway, a rotatable drive shaft, a cam on said drive shaft, a horizontally movable follower for said cam, a connection between said follower and said claw arm whereby longitudinal components of motion are imparted to said claw arm, a vertically movable follower frame for the cam pivoted on the movement frame, and a slide-connection between said follower frame and said claw arm whereby transverse components of motion are imparted to said claw arm.

4. In a film movement, the combination of a frame providing a vertical film guideway, a claw arm adapted to be operated to engage and move a film in the guideway, a rotatable drive shaft, a cam on said drive shaft, a horizontally movable follower for said cam, a connection between said follower and said claw arm whereby longitudinal components of motion are imparted to said claw arm, a vertically movable follower frame for the cam pivoted on the movement frame at a point to the rear of said cam, and a slide-connection between said follower frame and said claw arm whereby transverse components of motion are imparted to said claw arm.

5. In a film movement, the combination of a frame providing a vertical film guideway, a claw arm adapted to be operated to engage and move a film in the guideway, a rotatable drive shaft, a cam on said drive shaft, a horizontally movable follower for said cam, a connection between said follower and said claw arm whereby longitudinal components of motion are imparted to said claw arm, a vertically movable follower frame for the cam pivoted on the movement frame at a point to the rear of said cam, and a slide bearing for an intermediate section of the claw arm carried by said follower frame, said bearing supporting the claw arm in a plane passing through and pivoting on the axis of the pivotal mounting of the follower frame.

6. In a film movement, the combination of a frame providing a film guideway, a claw arm adapted to be operated to engage and move a film in the guideway, a rotatable drive shaft, a cam on said drive shaft, a movable follower for said cam, a connection between said follower and said claw arm whereby longitudinal components of motion are imparted to said claw arm, another movable follower for said cam, and a connection between said last mentioned follower and said claw arm longitudinally slidable with relation to said claw arm whereby transverse components of motion are imparted to said claw arm.

7. In a film movement, the combination of a frame providing a film guideway, a claw arm adapted to be operated to engage and move a film in the guideway, a rotatable drive shaft, a cam on said drive shaft, a movable follower for said cam, connection between said follower and said claw arm whereby longitudinal components of motion are imparted to said claw arm, another follower frame for the cam, and a slide-connection between said follower frame and said claw arm whereby transverse components of motion are imparted to said claw arm.

8. In a film movement, the combination of a frame providing a film guideway, a claw arm adapted to be operated to engage and move a film in the guideway, a rotatable drive shaft, a cam on said drive shaft, a movable follower for said cam, connection between said follower and said claw arm whereby longitudinal components of motion are imparted to said claw arm, another follower frame for the cam pivoted on the movement frame, and a slide-connection between said follower frame and said claw arm whereby transverse components of motion are imparted to said claw arm.

9. In a film movement, the combination of a frame providing a film guideway, a claw arm adapted to be operated to engage and move a film in the guideway, a rotatable drive shaft, a cam on said drive shaft, a movable follower for said cam, a connection between said follower and said claw arm whereby longitudinal components of motion are imparted to said claw arm, another follower frame for the cam pivoted on the movement frame, and a slide bearing for an intermediate section of the claw arm carried by said follower frame, said bearing supporting the claw arm in a plane passing through and pivoting on the axis of the pivotal mounting of the follower frame.

10. In a film movement, the combination of a frame providing a film guideway, a pivoted film moving claw arm operable to oscillate about its pivot and movable to and from the pivot, means for giving the claw arm motion to and from its pivot, said means including a motion transmitting link pivoted to the claw arm at one end and having a pivotal connection at the other end, and means connected with the last mentioned pivotal connection to move the link between two positions at which either one or the other of its pivotal connections is substantially concentric with the pivot about which the claw arm swings.

11. In a film movement, the combination of a frame providing a film guideway, a pivoted claw arm carrier, a film moving claw arm slidably mounted on said claw arm carrier so as to be movable toward and away from the pivot of said carrier, means for giving the claw arm motion to and from said pivot, said means including a motion transmitting link pivoted to the claw arm at one end and having a pivotal connection at the other end, and means connected with the last mentioned pivotal connection to move the link between two positions at which either one or the other of its pivotal connections is substantially concentric with the pivot about which the claw swings.

12. In a film movement, the combination of a frame providing a film guideway, a claw arm adapted to be operated to engage and move a film in the guideway, a rotatable drive shaft, a cam on said drive shaft, a movable follower for said cam, a connection between said follower and said claw arm whereby longitudinal components of motion are imparted to said claw arm, another movable follower for said cam, a connection between said last mentioned follower and said claw arm longitudinally slidable with relation to said claw arm whereby transverse components of motion are imparted to said claw arm, a film engageable member adapted to hold the film stationary, and an interconnection between said member and the first mentioned cam follower, whereby said member is operated to engage the film alternately with the claw arm.

13. In a film movement, the combination of a frame providing a film guideway, a claw arm adapted to be operated to engage and move a film in the guideway, a rotatable drive shaft, a cam on said drive shaft, a movable follower for said cam, a connection between said follower and said claw arm whereby longitudinal components of motion are imparted to said claw arm, another follower frame for the cam, and a slide-connection between said follower frame and said claw arm, whereby transverse components of motion are imparted to said claw arm, a film engageable member adapted to hold the film stationary, and an interconnection between said member and the first mentioned cam follower whereby said member is operated to engage the film alternately with the claw arm.

14. In a film movement, the combination of a frame providing a film guideway, a claw arm adapted to be operated to engage and move a film in the guideway, a rotatable drive shaft, a cam on said drive shaft, a movable follower for said cam, a connection between said follower and said claw arm whereby longitudinal components of motion are imparted to said claw arm, another follower frame for the cam pivoted on the movement frame, a slide-connection between said follower frame and said claw arm whereby transverse components of motion are imparted to said claw arm, a film engageable member adapted to hold the film stationary, and an interconnection between said member and the first mentioned cam follower whereby said member is operated to engage the film alternately with the claw arm.

15. In a film movement, the combination of a frame providing a vertical film guideway, a claw arm adapted to be operated to engage and move a film in the guideway, a rotatable drive shaft, a cam on said drive shaft, a horizontally movable follower for said cam, a connection between said follower and said claw arm whereby longitudinal components of motion are imparted to said claw arm, a vertically movable follower for said cam, a connection between said last mentioned follower and said claw arm longitudinally slidable with relation to said claw arm whereby transverse components of motion are imparted to said claw arm, a film engageable member adapted to hold the film stationary, and an interconnection between said member and the horizontally movable cam follower whereby said member is operated to engage the film alternately with the claw arm.

16. In a film movement, the combination of a frame providing a vertical film guideway, a claw arm adapted to be operated to engage and move a film in the guideway, a rotatable drive shaft, a cam on said drive shaft, a horizontally movable follower for said cam, a connection between said follower and said claw arm whereby longitudinal components of motion are imparted to said claw arm, a vertically movable follower frame for the cam, a slide-connection between said follower frame and said claw arm whereby transverse components of motion are imparted to said claw arm, a film engageable member adapted to hold the film stationary, and an operative interconnection between said member and the horizontally movable cam follower whereby said member is operated to engage the film alternately with the claw arm.

17. In a film movement, the combination of a frame providing a vertical film guideway, a claw arm adapted to be operated to engage and move a film in the guideway, a rotatable drive shaft, a cam on said drive shaft, a horizontally movable follower for said cam, a connection between said follower and said claw arm whereby longitudinal components of motion are imparted to said claw arm, a vertically movable follower frame for the cam pivoted on the movement frame, a slide-connection between said follower frame and said claw arm whereby transverse components of motion are imparted to said claw arm, a film engageable member adapted to hold the film stationary, and an interconnection between said member and the horizontally movable cam follower whereby said member is operated to engage the film alternately with the claw arm.

18. In a film movement, the combination of a frame providing a film guideway, a pivoted film moving claw arm operable to oscillate about its pivot and movable towards and from its pivot, means for giving the claw arm motion towards and from its pivot, said means including a motion transmitting member pivoted to the claw arm at one end, and means operating said member to move it between two positions in one of which the last mentioned pivotal connection is substantially concentric with the pivot about which the claw arm swings.

19. In a film movement, the combination of a frame providing a film guideway, a pivoted film moving claw arm operable to oscillate about its pivot and movable towards and from its pivot, means for giving the claw arm motion towards and from its pivot, said means including a motion transmitting link pivoted to the claw arm at one end and having a pivotal connection at the other end, and means connected with the last mentioned pivotal connection to move the link between two positions in one of which said last mentioned pivotal connection is substantially concentric with the pivot about which the claw arm swings.

20. In a film movement, the combination of a frame providing a film guideway, a pivoted oscillating claw arm carrier, a film moving claw arm slidably mounted on said claw carrier so as to be movable toward and away from the pivot of said carrier, means for giving the claw arm motion towards and away from said pivot, said means including a motion transmitting member pivoted to the claw arm at one end, and means operating said member to move it between two positions in one of which the last mentioned pivotal connection is substantially concentric with the pivot about which the claw carrier swings.

21. In a film movement, the combination of a frame providing a film guideway, a pivoted oscillating claw arm carrier, a film moving claw arm slidably mounted on said claw carrier so as to be movable toward and away from the pivot of said carrier, means for giving the claw arm motion towards and away from said pivot, said means including a motion transmitting link pivoted to the claw arm at one end and having a pivotal connection at the other end, and means connected with the last mentioned pivotal connection to move the link between two positions in one of which said last mentioned pivotal connection is substantially concentric with the pivot about which the claw carrier swings.

22. In a film movement, the combination of a frame providing a film guideway, a claw arm adapted to be operated to engage and move a film in the guideway, a rotatable cam, a movable follower for said cam pivoted on the movement frame, a slide-connection between said follower frame and said claw arm, another follower for said cam, and motion transmitting means between the last mentioned follower and the rear end of the claw arm including a member having a pivotal connection with the rear end of the claw arm.

23. In a film movement, the combination of a frame providing a film guideway, a claw arm adapted to be operated to engage and move a film in the guideway, a rotatable cam, a movable follower for said cam pivoted on the movement frame, a slide-connection between said follower frame and said claw arm, another follower for said cam, and motion transmitting means between the last mentioned follower and the rear end of the claw arm, said means including an arm pivoted on the frame end connected at one end to the last mentioned follower, and having at its other end a pivot connection with the claw arm.

24. In a film movement, the combination of a frame providing a film guideway, an oscillating claw arm for moving a film in the guideway, an operating cam mounted to rotate in the frame, a cam follower for taking off movement from the cam in a direction substantially at right angles to the guideway, motion transmitting means connected at one end with said follower and having at the other end a pivot connection with the rear end of the claw arm, whereby to impart longitudinal components of motion to the claw arm, and another cam follower taking off movement from the cam in a direction substantially parallel to the guideway, said last mentioned follower having a connection with the claw arm to swing the arm about a pivot axis near the rearward end of said arm whereby to move the forward end of the claw arm along the guideway, the parts being so arranged that the radial distance from the last mentioned pivot axis to the cam is less than the distance from said pivot axis to the forward end of the claw arm.

In witness that I claim the foregoing I have hereunto subscribed my name this 21 day of April 1930.

GEORGE A. MITCHELL.